United States Patent [19]

Namba et al.

[11] 4,409,354

[45] Oct. 11, 1983

[54] FLUORINATED RESIN COATING COMPOSITION CONTAINING MICACEOUS IRON OXIDE

[75] Inventors: Mutsusuke Namba, Settsu; Seisuke Suzue, Ibaraki; Toshio Mizuno, Takatsuki; Yoshiaki Kataoka, Settsu, all of Japan

[73] Assignee: Daikin Kogyo Co., Ltd., Osaka, Japan

[21] Appl. No.: 299,026

[22] PCT Filed: Jan. 21, 1981

[86] PCT No.: PCT/JP81/00013

§ 371 Date: Sep. 1, 1981

§ 102(e) Date: Sep. 1, 1981

[87] PCT Pub. No.: WO81/02161

PCT Pub. Date: Aug. 6, 1981

[51] Int. Cl.$^3$ .................... C08K 3/08; C08L 27/18; B32B 27/20; C09D 3/78
[52] U.S. Cl. .................... 524/431; 523/101; 524/536; 428/422
[58] Field of Search .............. 524/431, 536; 523/101; 428/422

[56] References Cited

U.S. PATENT DOCUMENTS

| 2,541,642 | 2/1951 | Downs et al. | 524/431 |
| 4,064,303 | 12/1977 | Vassiliou | 428/199 |
| 4,122,226 | 10/1978 | Vassiliou | 428/422 |
| 4,150,008 | 4/1979 | Vassiliou et al. | 428/422 |
| 4,180,609 | 12/1979 | Vassiliou | 428/422 |
| 4,250,215 | 2/1981 | Mayer | 428/422 |

FOREIGN PATENT DOCUMENTS

| 53-73231 | 6/1978 | Japan | 524/431 |
| 1557230 | 12/1979 | United Kingdom. | |
| 1560781 | 2/1980 | United Kingdom. | |

OTHER PUBLICATIONS

Chem. Abst. 86-73568-1977 Galembeck.
Chem. Abst. 89-198620-1978 Galembeck.
Chem. Abst. 90-39402-1979 Galembeck.
Chem. Abst. 93-187145-1980 Galembeck et al.

Primary Examiner—Melvyn I. Marquis
Assistant Examiner—Herbert J. Lilling
Attorney, Agent, or Firm—Birch, Stewart, Kolasch & Birch

[57] ABSTRACT

The present invention relates to a fluorinated resin coating composition comprising (a) a fluorinated resin, (b) micaceous iron oxide and (c) a liquid carrier. When the composition of the invention is used as a primer, an auxiliary agent for adhesion is necessitated as the supplemental component in addition to the components (a), (b) and (c). The composition of the invention can afford an excellent wear-resistance and is especially suitable for coating of inner surfaces of cooking utensils. The scratch-resistance of the coating film formed on a cooking utensil is greatly improved especially when the composition is employed for top coating. Sufficient improvement can be also attained in case of using the composition of the invention as a primer.

15 Claims, No Drawings

FLUORINATED RESIN COATING COMPOSITION CONTAINING MICACEOUS IRON OXIDE

DESCRIPTION

Field of Invention

The present invention relates to a fluorinated resin containing coating composition. As the coating composition, there are included primers, compositions for intermediary coating and compositions for top coating.

Background Technique

Fluorinated resins are utilized for coating of cooking utensils because of their peculiar non-adhesiveness. Since fluorinated resins are relatively soft synthetic resins, they are poor in resistance to scratching, for instance, by metal spatulas used in cooking. This disadvantage becomes marked at a high temperature of about 200° C.

Therefore, various methods have been developed for improving the scratch-resistance of fluorinated resin coating films. For example, Japanese Patent Publication No. 10386/1977 discloses a fluorinated resin coating film comprising a under-coat and a top coat made of a transparent fluorinated resin dispersion, characterized in that the under-coat consists of a fluorinated resin, mica particles and mica particles or metal flakes covered with a pigment. According to the investigation made by the present inventors, however, this coating film does not possess a practically satisfying wear-resistance.

For affording a wear-resistance to fluorinated resin coating films, a method has been put to practical use which comprises spraying a metal substrate, prior to application of a fluorinated resin, with a ceramic or a hard metal in a melted state so as to form an uneven layer on the substrate surface and then applying the fluorinated resin thereon. According to this method, adhesion of the coating film to the substrate is assured by an anchor effect, and the specific properties of the resin such as non-adhesiveness can be maintained even when a part of the surface portion of the coating film is taken off by scratching because the resin particles contained in the concave portions in the uneven layer on the substrate surface are not removed. Some concrete processes for effecting this method and materials to be used for melt-spraying have been proposed, but their practical use in usual cooking utensils is difficult because the metal materials employed are expensive, and in the case of ceramics, a plasma melt-spraying process requiring large equipment and power (energy cost) is necessary.

DISCLOSURE OF INVENTION

The present invention relates to a fluorinated resin coating composition which comprises (a) a fluorinated resin, (b) micaceous iron oxide and (c) a liquid carrier. When the composition containing the components (a), (b) and (c) does not contain an auxillary agent for adhesion, the composition of the invention is used for top coating or intermediary coating with a fluorinated resin. When any auxiliary agent is contained, it is mainly employed as a primer on a fluorinated resin coating but it is also utilizable as a composition for top coating or intermediary coating according to the desired purpose. The composition of the invention can overcome the above mentioned disadvantages as seen in the prior art and afford a fluorinated resin coating film being excellent in wear-resistance without any special process for application.

PREFERRED EMBODIMENT OF THE INVENTION

The micaceous iron oxide to be used in the composition of the invention (hereinafter referred to as "MIO" (Micaceous Iron Oxide)) is present as fine scale-like crystals mainly comprising ferric oxide ($\alpha$-$Fe_2O_3$). It has been used as a rust-preventing pigment and is commercially available (Color Material, Vol. 52, p. 258 (1979)). Since it is not poisonous and causes no environmental pollution, it can be used without trouble as a component of a coating composition for cooking utensils.

The flake size of the MIO crystals to be used in the composition of the invention is 5–100$\mu$, preferably 10–60$\mu$.

The mixing proportion of MIO to the fluorinated resin is 5–100% by weight, preferably 20–70% by weight. When the mixing proportion of MIO is smaller than 5% by weight, the wear-resistance of the coating film is not obtained. When it is larger than 100% by weight, the non-adhesiveness of the coating film is reduced. In case of incorporating an adhesion-auxiliary agent so as to use the composition of the invention as a primer, the mixing proportion of MIO to the adhesion-auxiliary agent is, within the above mentioned range, from 10 to 50% by weight, and the ratio of the total weight of the adhesion-auxiliary agent and MIO to the weight of the fluorinated resin is desired to be 2–10:10.

The fluorinated resins to be used in the invention include homopolymers and copolymers of fluoroolefins such as tetrafluoroethylene, hexafluoropropene, chlorotrifluoroethylene, vinylidene fluoride and vinyl fluoride, copolymers of said fluoroolefins with other olefins such as ethylene and propylene (the amount of the fluoroolefins being at least 75% by weight), etc. Among these, tetrafluoroethylene polymers such as polytetrafluoroethylene, tetrafluoroethylene-hexafluoropropene copolymer and tetrafluoroethylene-ethylene copolymer are especially preferable. The particle size of the fluorinated resin is desired to be about 50$\mu$ or less, preferably 0.1–50$\mu$. The dispersing particles in the dispersion produced by a conventional emulsion polymerization process usually have a particle size of 0.1 to 3.0$\mu$, so that such a dispersion is suitable for the composition of the invention. This dispersion can be advantageously used as such in the preparation of the composition of the invention. The content of the fluorinated resin in the composition of the invention is usually 10 to 40% by weight.

As the adhesion-auxiliary agent, there may be employed chromic acid, chromic acid-phosphoric acid mixtures, oxides of metals such as copper, zinc and cadmium, metal salts of phosphoric acid, organic chelate compounds of transition metals of group IV in the periodic table such as titanium and zirconium, silicon compounds such as alkali and amine silicates, alkyl silicates, lithium polysilicates and silica colloid, aromatic polyamidoimide resins and polyimide resins, polyarylene sulfide resins such as polyphenylene sulfide resins, polyether sulfone resins, polysulfone resins, etc.

As the liquid medium in the composition of the invention, water is usually employed to make the composition an aqueous dispersion. Organic solvents may be also employed as the liquid medium. Examples of such organic solvents are N,N-dimethylformamide, N,N-dimethylacetamide, N-methyl-2-pyrrolidone, dimethylsulfoxide, methyl ethyl ketone, methyl glycol acetate, 2-nitropropane, ethylene glycol acetate, toluene, etc. In the case of using polyamide resins or polyimide resins as the adhesion-auxiliary agent, N-methylpyrrolidone, cresol, phenol, naphtha, dimethylformamide, dimethylacetamide, benzonitrile, methyl glycol acetate, methyl ethyl ketone, 2-nitropropane, ethyl glycol acetate, ethyl acetate, xylene, toluene and methyl isobutyl ketone, and mixtures of two or more of them (e.g. a mixture of N-methylpyrrolidone with toluene, ethyl acetate, butyl glycol, dioxane or the like) are favorably employed as the organic solvent. In case of using polyether sulfone resins or polysulfone resins, dimethylformamide, cyclohexanone, dichloromethane, 1,1,2-trichloroethane, N-methyl-2-pyrrolidone, etc. are employed as the organic solvent.

In addition to the fluorinated resin and MIO, the composition of the invention may contain other additives such as various surface active agents (e.g. anionic surface active agents, nonionic surface active agents), pigments (e.g. oxides of titanium and iron), viscosity-regulating agents and caking agents (e.g. methyl cellulose, ethyl cellulose), levelling agents (e.g. fluoroalkylcarbonic acids), hardening agents (e.g. metal powders, metal compounds) and wetting agents (e.g. organic solvents).

The composition of the invention is prepared by uniformly dispersing the fluorinated resin and MIO in the above mentioned mixing ratio into the liquid medium. It is most advantageous to employ the fluorinated resin and MIO in the form of a liquid dispersion and to admix them together. In case of incorporating an adhesion-auxiliary agent, it is also employed in the form of dispersion or solution and admixed with the dispersions of the fluorinated resin and MIO. When the starting fluorinated resin is in a powder form, it is added to an aqueous dispersion of MIO and admixed uniformly. For attaining uniform mixing, the use of a colloid mill, a ball mill or the like is preferable.

The following is the explanation about the application of the coating composition of the invention to a substrate such as a metal.

In applying the primer composition of the invention to a substrate, the surface of the substrate (e.g. metal, glass, ceramics) is previously roughened by a chemical or physical procedure, and after cleaning the surface, the composition of the invention is applied thereon by a conventional process such as brushing, spraying, immersion or pouring so as to make a coating film which will have a thickness of about 5–30μ after calcination. The thus coated film is then dried to eliminate water and volatile components present in the composition. Drying is effected in air or under heating at about 100° C. Calcination of the thus dried coating film is required to be effected at a temperature higher than the melting point of the fluorinated resin. In case of a tetrafluoroethylene resin, the calcination temperature is in a range of from 327° to 400° C. The calcination is usually effected by keeping the coated substrate in a furnace for several minutes to several hours. After the calcination, the substrate is cooled. Cooling is effected gradually by allowing the substrate to stand or rapidly by placing it into water.

In case of the adhesion-auxiliary agent contained in the composition being a transition metal chelate compound, the organic group portion is completely decomposed by the calcination at such a high temperature as mentioned above, and the metal portion remains in the coating film as an oxide to enhance the adherence of the coating film.

When a coating film derived from the MIO-containing primer composition of the invention is formed on a substrate as mentioned above, it is not required to employ the MIO-containing composition of the invention as the top coating paint to be applied on the thus formed coating film, but a conventional fluorinated resin paint for top coating can be employed by a suitable procedure selected from usual ones including spraying and powdering. Alternatively, a previously prepared fine film of a fluorinated resin may be put on the primer coating film by heat-pressing to form an excellent fluorinated resin film on the substrate. It is not required that the kind of the fluorinated resin to be used for top coating is the same as that for under-coating, and an appropriate kind of resin may be chosen for the top layer on the use.

The thus obtained fluorinated resin film shows an excellent wear-resistance without melt-spraying with ceramics or hard metals on the substrate, and reduction of the adhesion is not observed.

For formation of an intermediary coating film or a top coating film on the fluorinated resin coating from the composition of the invention substantially containing no adhesion-auxiliary agent, it is applied on a primer coating layer formed on the substrate by a conventional procedure such as spraying or brushing. In this case, the primer to be used is not necessarily required to be the primer of the invention, but a conventional primer not containing MIO may be employed. When the primer of the invention is used, the wear-resistance of the coating film is much improved.

The thus obtained fluorinated resin film possesses an improved wear-resistance, and even when MIO is contained in the top coating layer, reduction of the non-adhesiveness is hardly observed.

The present invention will be hereinafter explained further in detail by Examples and Comparative Examples.

EXAMPLE 1 (1)–(12) AND COMPARATIVE EXAMPLES 2–3

Polytetrafluoroethylene ("Polyfron Dispersion D-1" manufactured by Daikin Kogyo Co., Ltd.; aqueous; solid content, 60%), MIO having an average long axis of flake of 100μ, 50μ or 5μ ("KS" manufactured by Kikuchi Shikiso Kogyo Co., Ltd.) and a quaternary amine silicate (manufactured by Nissan Chemical Co., Ltd.; solid content, 30%) are admixed in a mixing proportion as shown in Table 1, and an aqueous solution of methyl cellulose (solid content, 5%) is added thereto to regulate the viscosity so as to obtain a fluorinated resin composition being suitable for application by spraying.

On an aluminum plate and an aluminum frying pan whose surfaces are previously roughened with sand blast, a primer for fluorinated resin ("Polyfron EK-1783GB" manufactured by Daikin Kogyo Co., Ltd.) is applied by spraying to make a film thickness of 7–12μ after calcination.

The thus treated aluminum substrates are heated by an infrared drier to eliminate sufficiently volatile components and then placed into an electric heating furnace kept at 380° C. so as to effect calcination-melt adhesion treatment for 20 minutes. After the treatment, the substrates are taken out from the furnace and allowed to stand at room temperature for cooling. On the thus formed primer coating film, the above prepared fluorinated resin coating composition is applied by spraying to make a film thickness of 20-25μ after calcination. Then, the same procedure as in the primer is repeated to effect drying and calcination-melt adhesion.

The physical properties of the thus obtained coating film (non-adhesivenss and wear-resistance) are determined. The results are shown in Table 1.

The determination of the physical properties is effected in the following mannner:

Non-adhesiveness: The frying pan to be tested is used for cooking under the same condition as in cooking for normal families for 1 year, and thereafter the adhesiveness of cooked foods is observed. The evaluation is effected according to the following criteria:

O: Adhesion of cooked foods is not caused.
Δ: Adhesion of a small amount of cooked foods is caused.
X: Adhesion of a large amount of cooked foods is caused.

Wear-resistance: The test is effected in the test apparatus wherein the test sample is fixed on an electric heating hot plate and, after regulation of the heating system so as to keep the aluminum plate at 200° C.±10° C., a metal spatula given a designed charge is made to move on the surface of the aluminum plate in contact therewith. The metal spatula which is made of stainless steel and is 15 mm in width and 0.5 mm in thickness is contacted with the surface of the test sample in an angle of 45° and is made to linearly reciprocate before and behind (vertically to the width of the metal spatula) under a charge of 300 g. The top portion of the metal spatula contacting with the test sample is repolished at each determination so as to make a right angle. By this test procedure, the degree of wear due to the motion and the scratch of the metal spatula is determined under conditions corresponding to that in cooking for about 2 years for normal families. The criteria of estimation is as follows:

◎: Exposure of the substrate metal is not caused at all.
O: Extremely slight exposure of the substrate metal is caused.
Δ: Slight exposure of the substrate metal is caused.
X: Complete exposure of the substrate metal is caused.

When the same aluminum plate as above is subjected to melt-spraying with nickel aluminide ("Meteco 404" manufactured by Meteco Corp., USA) to make a film thickness of 25μ and then to coating with polytetrafluoroethylene primer ("Polyfron EK-1783GB" manufactured by Daikin Kogyo Co., Ltd.) and a paint for top coating ("ES-5109BK" manufactured by Daikin Kogyo Co., Ltd.) to make a film thickness of 10μ and 20-30μ, respectively, the wear-resistance of the thus prepared product corresponds to O-Δ in the above criteria.

COMPARATIVE EXAMPLES 1 AND 4

The sme procedure as in Example 1 is repeated but using paste of red iron oxide (a mixture obtained by admixing under crushing red iron oxide pigment (30 parts by weight), deionized water (65 parts by weight) and sodium laurylsulfate (5 parts by weight) by a paint mill) in place of MIO. The results are shown in Table 1.

TABLE 1

|  | Average particle size of MIO (μ) | Mixing proportion (% by weight) | | | Physical properties of coating film | |
|---|---|---|---|---|---|---|
|  |  | MIO PTFE[1] | Red iron oxide PTFE[1] | Solid component in quaternary amine silicate/PTFE[1] | Non-adhesiveness | Wear-resistance |
| Example 1 (1) | 5 | 30 | — | — | O | Δ |
| Example 1 (2) | 50 | 30 | — | — | O | O |
| Example 1 (3) | 100 | 30 | — | — | Δ | O |
| Comparative Example 1 | — | — | 30 | — | O | X |
| Comparative Example 2 | 50 | 3 | — | — | O | X |
| Example 1 (4) | 50 | 5 | — | — | O | Δ |
| Example 1 (5) | 50 | 10 | — | — | O | Δ |
| Example 1 (6) | 50 | 20 | — | — | O | O |
| Example 1 (7) | 50 | 50 | — | — | O | ◎ |
| Example 1 (8) | 50 | 70 | — | — | Δ | ◎ |
| Example 1 (9) | 50 | 100 | — | — | Δ | ◎ |
| Comparative Example 3 | 50 | 150 | — | — | X | ◎ |
| Example 1 (10) | 50 | 30 | — | 0.5 | O | O |
| Example 1 (11) | 50 | 30 | — | 10 | O | ◎ |
| Example 1 (12) | 50 | 30 | — | 50 | Δ | ◎ |
| Comparative Example 4 | — | — | 30 | 10 | O | X |

Note:
[1]Polytetrafluoroethylene

EXAMPLE 2

In the same manner as in Example 1, a primer for fluorinated resin ("Polyfron EK-1783GB" manufactured by Daikin Kogyo Co., Ltd.) is applied on an aluminum plate and an aluminum frying pan whose surfaces are previously roughened with sand blast, and the subsequent treatment comprising drying, calcination and melt-adhesion is carried out. Then, the coating composition of Example 1 (8) is applied thereon by spraying as in the case of the primer of Example 1 to make a film thickness of 20-25μ after calcination, and the subsequent treatment comprising drying, calcination and melt-adhesion is effected as in the case of the primer. On the thus prepared coating film, the coating composition of Comparative Example 1 is applied by spraying to make a film thickness of 20-25μ after calcination, and the subsequent treatment comprising drying, calcination and melt-adhesion is effected as in the case of the primer.

The thus obtained coating film comprising the three layers is subjected to determination of the non-adhesiveness and the wear-resistance according to the procedure as in Example 1. As to the non-adhesiveness, adhesion of cooked foods is not caused even after cooking under the one year-cooking condition. As to the wear-resistance, exposure of the substrate metal does not occur even under the 3 year-wearing condition.

Separately, a coating film consisting of three layers is prepared in the same manner as above but employing the coating composition of Comparative Example 1 for formation of the second layer, and its non-adhesiveness and wear-resistance are determined. As to the non-adhesiveness, adhesion of cooked foods is not caused even after cooking under the one year-cooking condition. About the wear-resistance, complete exposure of the substrate metal occurs under the 2 year-wearing condition.

EXAMPLE 3

The coating compositions A and B comprising the following components are prepared:

| Coating composition A | |
|---|---|
| Polytetrafluoroethylene ("Polyfron Dispersion D-1" manufactured by Daikin Kogyo Co., Ltd.; aqueous; solid content, 60%) | 100 parts by weight |
| MIO ("KS" manufactured by Kikuchi Shikiso Kogyo Co., Ltd.) | 18 parts by weight |
| Colloidal silica ("Snowtex S" manufactured by Nissan Chemical Co., Ltd.; solid content, 30%) | 6 parts by weight |
| Triton X-100 (Nonionic surface active agent manufactured by Rohm & Haas Corp.; 20% aqueous solution) | 18 parts by weight |
| Deionized water | 15 parts by weight |
| Coating composition B | |
| Polytetrafluoroethylene (same as in Composition A) | 80 parts by weight |
| Deionized water | 13 parts by weight |
| Xylene | 3 parts by weight |

On an aluminum plate and an aluminum frying pan whose surfaces are previously roughened with sand blast, the primer for fluorinated resin is applied, and the calcination and melt-adhesion treatment is effected as in Example 1. Then, the coating composition A for intermediary coating is applied thereon by spraying to make a film thickness of 20–25μ after calcination, and the subsequent treatment comprising drying, calcination and melt-adhesion is effected as in the case of the primer of Example 1. Thereafter, the coating composition B for top coating is applied thereon by spraying to make a film thickness of 10–15μ after calcination, and the subsequent treatment comprising drying, calcination and melt-adhesion is effected as in intermediary coating.

The thus obtained coating film is subjected to determination of the non-adhesiveness and the wear-resistance as in Example 1. As to the non-adhesiveness, adhesion of cooked foods is not observed even after cooking under the one year-cooking condition. About the wear-resistance, exposure of the substrate metal is not caused under the one year-wearing condition.

Separately, a coating film is prepared as above but using the coating composition C comprising the below-mentioned components as the intermediary coating composition, and its non-adhesiveness and wear-resistance are determined as in Example 1. As to the non-adhesiveness, adhesion of cooked foods is not observed even after cooking under the one-year cooking condition. About the wear-resistance, complete exposure of the substrate metal is caused under the one year-wearing condition.

| Coating composition C | |
|---|---|
| Polytetrafluoroethylene (same as in Composition A) | 100 parts by weight |
| Mica covered with TiO$_2$ (manufactured by E. Merck GmbH) | 10 parts by weight |
| Triton X-100 | 20 parts by weight |
| Deionized water | 15 parts by weight |

EXAMPLE 4 (1)–(6)

Polytetrafluoroethylene ("Polyfron Dispersion D-1" manufactured by Daikin Kogyo Co., Ltd.; aqueous; concentration, 60%), an organic titanium chelate compound (amine chelate described in Japanese Patent Publication No. 150735/1975) and MIO (manufactured by Kikuchi Shikiso Kogyo Co., Ltd.; average long axis, 60μ) are admixed in the mixing proportion as shown in Table 2, and an adequate amount of an aqueous solution of methyl cellulose (solid content, 5%) is added thereto to prepare a primer for coating film formation being suitable for spraying.

On an aluminum frying pan whose surface is previously roughened with sand blast, the above obtained primer is applied by spraying to make a film thickness of 7–12μ after calcination. The frying pan is then heated by the aid of an infrared drier to eliminate volatile components sufficiently and then placed into an electric heating furnace kept at 380° C. to effect the treatment of calcination and melt-adhesion for 20 minutes. The frying pan is taken out from the furnace and cooled spontaneously at room temperature.

On the thus formed under-coating film, polytetrafluoroethylene enamel for top coating (polyfron enamel for top coating "ES-5109BK" manufactured by Daikin Kogyo Co., Ltd.) is applied by spraying to make a film thickness of 25–30μ after calcination, and the subsequent treatment comprising drying, calcination and melt-adhesion is effected as in the case of the primer. The thus treated frying pan is cooled spontaneously at room temperature. The obtained coating film is subjected to determination of the non-adhesiveness and wear-resistance as in Example 1. The results are shown in Table 2.

COMPARATIVE EXAMPLE 5

The same procedure as in Example 4 is repeated but using paste of red iron oxide (a mixture obtained by admixing under crushing red iron oxide pigment (30 parts by weight), deionized water (65 parts by weight) and sodium laurylsulfate (5 parts by weight) by the aid of a paint mill) in place of MIO. The results are shown in Table 2.

TABLE 2

| | Mixing proportion (by weight) | | | Physical properties of coating film | |
|---|---|---|---|---|---|
| | PTFE[(1)] / TiO$_2$[(2)] | MIO / TiO$_2$[(2)] | Red iron oxide / PTFE[(1)] | Non-adhesiveness | Wear-resistance |
| Example 4 (1) | 10/3 | 30% | — | | |
| Example 4 (2) | 10/3 | 5% | — | | △ |
| Example 4 (3) | 10/3 | 10% | — | | |
| Example 4 (4) | 10/3 | 30% | — | | |
| Example 4 (5) | 10/3 | 50% | — | | |
| Example 4 (6) | 10/3 | 70% | — | | △ |
| Comparative Example 5 | 10/3 | — | 30% | | X |

Note:
[(1)]Polytetrafluoroethylene
[(2)]TiO$_2$ in organic titanium chelate

EXAMPLE 5

Polytetrafluoroethylene aqueous dispersion ("Polyfron D-1" manufactured by Daikin Kogyo Co., Ltd.; solid content, 60%) (100 parts by weight), colloidal silica ("Snowtex-30" manufactured by Nissan Chemical Co., Ltd.) (40 parts by weight), a 4% aqueous solution of methyl cellulose (5 parts by weight) and MIO (same as in Example 4) (12 parts by weight) are admixed uniformly to prepare a fluorinated resin primer, and using the thus obtained primer, a coating film is prepared in the same manner as in Example 4. In the non-adhesiveness test of the thus formed coating film, adhesion of cooked foods is not observed. In the wear-resistance test, exposure of the substrate metal is not caused.

EXAMPLE 6

Polytetrafluoroethylene aqueous dispersion (a mixture of colloidal particles of polytetrafluoroethylene having a particle size of 0.2–0.4μ (50 parts by weight), sodium salt of sulfuric acid ester of lauryl alcohol (2.5 parts by weight) and water (47.5 parts by weight)) (100 parts by weight) and water (54.8 parts by weight) are admixed uniformly to prepare the composition A. Separately, anhydrous chromic acid (CrO$_3$) (41.0 parts by weight) is dissolved in water (23.8 parts by weight) to prepare the composition B.

The composition A (100 parts by weight), the composition B (20 parts by weight) and MIO (same as in Example 4) (6 parts by weight) are mixed together to prepare a primer composition. Using the thus obtained primer composition, a coating film is prepared in the same manner as in Example 4. In the non-adhesiveness test of the thus formed coating film, adhesion of cooked foods is not observed. In the wear-resistance test, exposure of the substrate metal is not caused.

INDUSTRIAL APPLICABILITY

The fluorinated resin coating composition of the invention is especially suitable for fluorinated resin coating to portions which are required to have a wear-resistance. Typical examples of portions to which the composition of the invention will be advantageously applied are inner surfaces of cooking utensils such as frying pans which are required to possess a resistance against scratch by metal spatulas and the like. Further, the composition of the invention can be applied to bearings, various roll surfaces, various parts performing rubbing motions and other machine elements being required to have a wear-resistance so as to improve durabilities of coating films.

We claim:

1. A fluorinated resin coating composition comprising (a) a fluorinated resin, (b) micaceous iron oxide and (c) a liquid carrier.

2. The composition according to claim 1, wherein the fluorinated resin is a homopolymer or copolymer of tetrafluoroethylene.

3. The composition according to claim 1 or 2, wherein the mixing proportion of the micaceous iron oxide to the fluorinated resin is 5–100% by weight.

4. The composition according to claim 3, wherein the mixing proportion of the micaceous iron oxide to the fluorinated resin is 20–70% by weight.

5. The composition according to claim 1, wherein an auxiliary agent for adhesion is contained in addition to the components (a)–(c).

6. The composition according to claim 5, wherein the mixing proportion of the micaceous iron oxide to the adhesion auxiliary agent is 10 to 50% by weight and the ratio of the total weight of the adhesion auxiliary agent and the micaceous iron oxide to the weight of the fluorinated resin is 2–10:10.

7. An article having the composition of claim 1 coated thereon.

8. An article having the composition of claim 2 coated thereon.

9. An article having the composition of claim 3 coated thereon.

10. An article having the composition of claim 4 coated thereon.

11. An article having the composition of claim 5 coated thereon.

12. An article having the composition of claim 6 coated thereon.

13. A method for improving the scratch resistance of an article comprising coating an article with a fluorinated resin coating composition comprising (a) a fluorinated resin, (b) micaceous iron oxide, and (c) a liquid carrier.

14. The method according to claim 13, wherein said fluorinated resin is a homopolymer or a copolymer of tetrafluoroethylene.

15. The method according to claim 13, wherein the mixing proportion of the micaceous iron oxide to the fluorinated resin is about 20–70% by weight.

* * * * *

UNITED STATES PATENT AND TRADEMARK OFFICE
CERTIFICATE OF CORRECTION

PATENT NO. : 4,409,354

DATED : October 11, 1983

INVENTOR(S) : Mutsusuke NAMBA et al

It is certified that error appears in the above-identified patent and that said Letters Patent is hereby corrected as shown below:

On the title page:

IN THE HEADING OF THE PATENT:

In Section [30] insert:

-- January 21, 1980 [JP]  Japan ............5909/1980--
-- January 21, 1980 [JP]  Japan ............5910/1980--

Signed and Sealed this

Thirtieth Day of April 1985

[SEAL]

Attest:

DONALD J. QUIGG

Attesting Officer  Acting Commissioner of Patents and Trademarks